United States Patent
Dropps et al.

(10) Patent No.: US 8,441,929 B1
(45) Date of Patent: *May 14, 2013

(54) METHOD AND SYSTEM FOR MONITORING A NETWORK LINK IN NETWORK SYSTEMS

(75) Inventors: Frank R. Dropps, Maple Grove, MN (US); Bret E. Indrelee, Edina, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 180 days.

This patent is subject to a terminal disclaimer.

(21) Appl. No.: 13/026,007

(22) Filed: Feb. 11, 2011

Related U.S. Application Data

(63) Continuation of application No. 11/864,651, filed on Sep. 28, 2007, now Pat. No. 7,903,558.

(51) Int. Cl.
*G01R 31/08* (2006.01)

(52) U.S. Cl.
USPC .......................................... 370/232; 370/252

(58) Field of Classification Search ......................... None
See application file for complete search history.

(56) References Cited

U.S. PATENT DOCUMENTS

| | | | |
|---|---|---|---|
| 6,690,668 B1 * | 2/2004 | Szczepanek et al. | 370/392 |
| 7,039,057 B1 | 5/2006 | Acharya et al. | |
| 7,457,313 B2 * | 11/2008 | Patrick | 370/468 |
| 7,693,081 B1 * | 4/2010 | Zriny et al. | 370/242 |
| 2003/0074449 A1 | 4/2003 | Smith et al. | |
| 2003/0095501 A1 | 5/2003 | Hofner et al. | |
| 2005/0243862 A1 * | 11/2005 | Krishnan | 370/468 |
| 2008/0052394 A1 * | 2/2008 | Bugenhagen et al. | 709/224 |
| 2008/0144519 A1 | 6/2008 | Cooppan | |
| 2011/0032821 A1 * | 2/2011 | Morrill et al. | 370/230 |

OTHER PUBLICATIONS

"Office Action from USPTO dated Sep. 28, 2010 for U.S. Appl. No. 11/864,651".
"Notice of Allowance from USPTO dated Jan. 24, 2011 for U.S. Appl. No. 11/864,651".

* cited by examiner

*Primary Examiner* — Phirin Sam
(74) *Attorney, Agent, or Firm* — Klein, O'Neill & Singh, LLP

(57) ABSTRACT

Method for reporting bandwidth loss on a network link that couples a switch element to a network is provided. The method includes determining if credit is unavailable to transmit a packet and a packet is available at a switch port for transmission; determining bandwidth loss due to lack of credit; and reporting the bandwidth loss to a processor of the network switch. The switch element includes a processor for executing firmware code; a port for receiving and transmitting network packets; and a bandwidth loss logic that determines bandwidth loss if credit is unavailable to transmit a packet and the packet is available at the port; and reports the bandwidth loss to the processor.

24 Claims, 6 Drawing Sheets

METHOD AND SYSTEM FOR MONITORING A NETWORK LINK IN NETWORK SYSTEMS

CROSS-REFERENCE TO RELATED APPLICATION

This application is a continuation of application Ser. No. 11/864,651, filed on Sep. 28, 2007 now U.S. Pat. No. 7,903,558, the entire contents of which are hereby incorporated by reference.

BACKGROUND

1. Technical Field

This disclosure relates in general to network systems, and more particularly to reporting bandwidth loss on a network link in network systems.

2. Related Art

Network systems are commonly used to move network information (may also be referred to interchangeably, as frames, packets or commands) between computing systems (for example, servers) or between computing systems and network devices (for example, storage systems). Various hardware and software components are used to implement network communication, including network switches.

A network switch is typically a multi-port device where each port manages a point-to-point connection between itself and an attached system. Each port can be attached to a server, peripheral, input/output subsystem, bridge, hub, router, or another switch. A switch typically receives messages from one port and routes it to another port based on packet headers and routing table values. The term network switch as used herein includes, but is not limited to a Multi-Level switch that uses plural switching elements within a single switch chassis to route data packets.

Typically, bandwidth available for data transmission on a network depends on the type of network link. It is desirable to make optimum use of available bandwidth on a network link.

Network links may suffer some bandwidth loss due to a variety of reasons, including loss of credit to transmit frames. The bandwidth loss generally goes unreported in conventional switches. This can affect overall network performance. Therefore what is needed is a system and associated methods for determining and reporting bandwidth loss on a network link.

SUMMARY

In one embodiment, a method for reporting bandwidth loss on a network link that couples a switch to a network is provided. The method comprises determining if credit is unavailable to transmit a packet and a packet is available at a switch port for transmission; determining bandwidth loss due to lack of credit; and reporting the bandwidth loss to a processor of the network switch.

In another embodiment, a method for reporting bandwidth loss on a network link that couples a switch to a network is provided. The method comprises defining a parameter for selecting network packets; determining bandwidth loss on selected network packets; and reporting bandwidth loss to a processor for the network switch.

In another embodiment, a switch element coupled to a network via a network link is provided. The switch element comprises a processor for executing firmware code; a port for receiving and transmitting network packets; and a bandwidth loss logic that determines bandwidth loss if credit is unavailable to transmit a packet and the packet is available at the port; and reports the bandwidth loss to the processor.

In yet another embodiment, a switch element coupled to a network via a network link is provided. The switch element comprises a processor for executing firmware code; a port for receiving and transmitting network packets; and a bandwidth loss logic for determining and reporting bandwidth loss; wherein a parameter for determining bandwidth loss is defined; and the bandwidth loss logic determines bandwidth loss on network packets selected using packet selection parameters; and reports bandwidth loss to the processor.

This brief summary has been provided so that the nature of the disclosure may be understood quickly. A more complete understanding of the disclosure can be obtained by reference to the following detailed description of the embodiments thereof concerning the attached drawings.

BRIEF DESCRIPTION OF THE DRAWINGS

The foregoing features and other features of the present disclosure will now be described with reference to the drawings of the various embodiments. In the drawings, the same components have the same reference numerals. The illustrated embodiments are intended to illustrate, but not to limit the disclosure. The drawings include the following Figures.

DETAILED DESCRIPTION

The following definitions are provided for convenience as they are typically (but not exclusively) used in the Infiniband ("IB") and general networking environments, implementing the various adaptive aspects described herein.

"Destination local identifier" or "DLID": A field in an IB packet identifying a local subnet packet destination.

"Inter switch link" or "ISL": A physical link that is used for connecting two or more IB switch ports.

"Multi Level Switch": A switch that includes a plurality of switch elements operationally coupled together.

"Opcode": A field in an IB packet that indicates the IB packet type.

"Packet": A group of one or more network data word(s) used for network communication. IB based network devices typically use packets to communicate.

"Queue Pair" or "QP": A field in an IB packet that indicates a work queue pair number at a destination. QP is defined by the IB specification.

"Routing Table": A table that stores information for routing a packet.

"Source local identifier" or "SLID": A field in an IB packet identifying a local subnet packet source.

"Spine": A switch element within a Multi Level switch and is primarily used for switching data packets between other switch elements of the Multi Level switch. Spine may also be referred to as a cross connect switch element.

"Switch": A device that facilities network communication conforming to IB and other switch standards/protocols (for example, Ethernet, Fibre Channel and others).

It should be understood that the techniques of the present disclosure described below may be implemented using a variety of technologies. For example, methods described herein may be implemented in firmware executed by a processor or state machine, or implemented in hardware using either a combination of processor or other specially designed application specific integrated circuits, programmable logic devices, or various combinations thereof.

To facilitate an understanding of the various embodiments, the general architecture and operation of a network system will be described. The specific architecture and operation of the various embodiments will then be described with reference to the general architecture of the network system.

The embodiments of the present disclosure are described with respect to the IB standards for illustrative purposes only. The systems and methods of the present disclosure may be used with any network standard/protocol, for example, Ethernet, Fibre Channel and others.

IB is a switched fabric interconnect standard for servers, incorporated herein by reference in its entirety. IB technology is deployed for server clusters/enterprise data centers ranging from two to thousands of nodes. The IB standard is published by the InfiniBand Trade Association, and is incorporated herein by reference in its entirety.

Figure 1A:
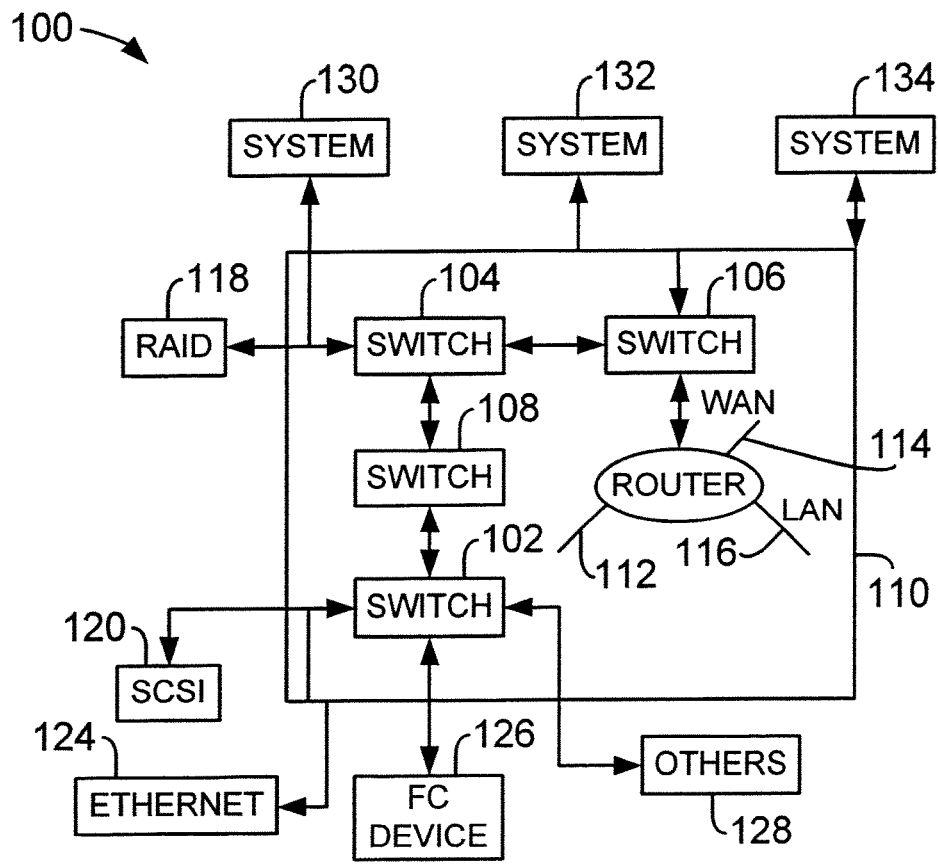
FIG. 1A shows a block diagram of a network system, according to one embodiment.

FIG. 1A shows a block diagram for network system 100 with various devices. System 100 includes a fabric 110, which includes plural switches 102, 104, 106 and 108 for moving network packets. Fabric 110 also includes a router 112 that is coupled to a wide area network (WAN) 114 and local area network (LAN) 116.

Switch 104 may be operationally coupled to a RAID storage system 118 and system 130, while system 132 and 134 may be operationally coupled to switch 106.

Switch 102 may be coupled to a small computer system interface ("SCSI") SCSI port 120 that is coupled to SCSI based devices. Switch 102 may also be coupled to an Ethernet port 124, Fibre Channel device(s) 126 and other device(s) 128.

Systems (130, 132, 134) typically include several functional components. These components may include a central processing unit (CPU), main memory, input/output ("I/O") devices, and streaming storage devices (for example, tape drives). In conventional systems (130, 132 and 134), the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

Figure 1B:
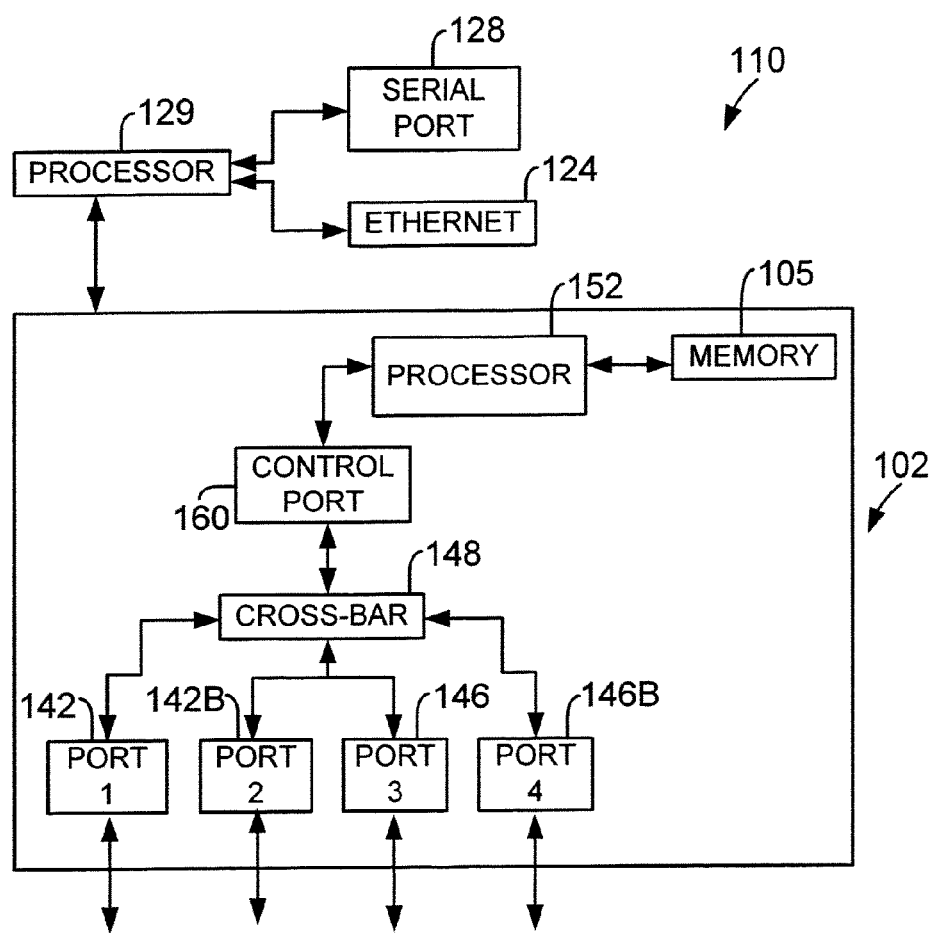
FIGS. 1B and 1C show a block diagram of a switch using the network system, according to one embodiment.

FIG. 1B shows a block diagram of an IB switch 102. An IB switch is typically a multi-port device. Physical links (optical or copper) connect each port in a switch to another IB switch or an end device (for example, Target Channel Adapter (TCA) or a Host Channel Adapter (HCA) (not shown)).

Switch 102 includes a processor 152, plural ports 142, 142B, 146, 146B, a control port 160 and crossbar 148. In one embodiment, processor 152 may be a reduced instruction set computer (RISC) type processor. Processor 152 controls overall switch 102 operations by executing firmware instructions stored in memory 105. In one embodiment, bandwidth loss is reported to processor 152, as described below.

Ports 142, 142B, 146 and 146B may be generic ports and may be configured to operate based on the type of device and network environment. Crossbar 148 is used for communication between the plural ports.

Processor 152 uses control port 160 to communicate with ports 142, 142B, 146 and 146B and when needed, also control ports 142, 142B, 146 and 146B operations.

Switch 102 may also be coupled to an external processor 129 that is coupled to an Ethernet port 124 and serial port 128. In one embodiment, processor 129 may be a part of computing systems 130, 132, 134.

The switch element 102 may be implemented as a single CMOS ASIC, and for this reason the term "switch", "switch element" and ASIC are used interchangeably to refer to the various embodiments in this specification.

Figure 1C:
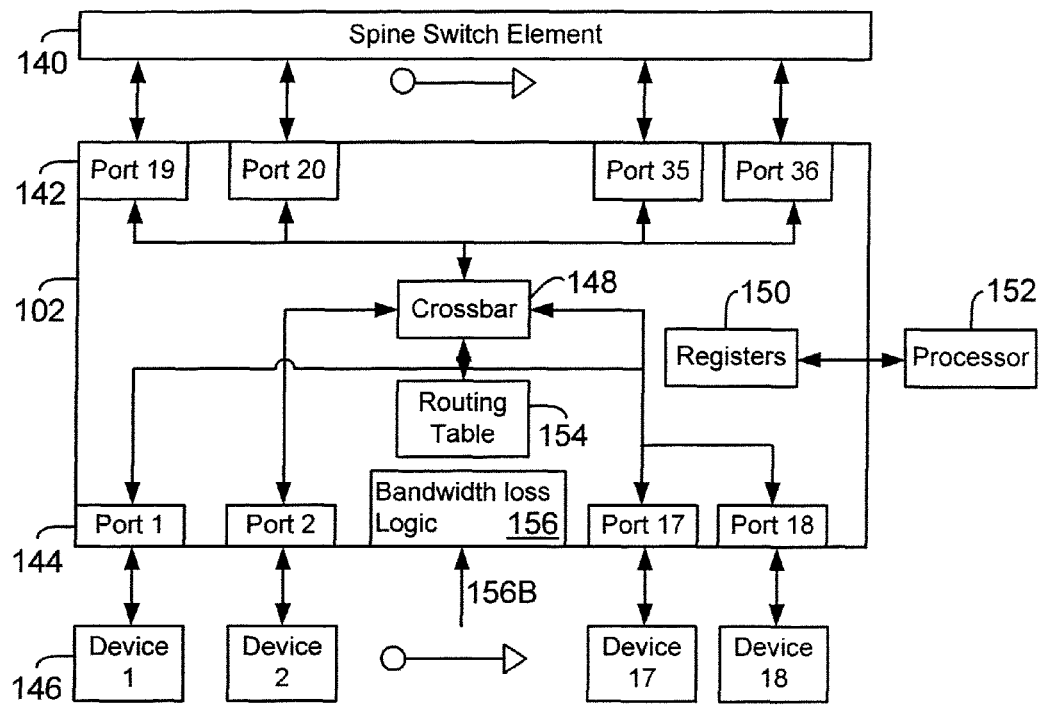

FIG. 1C shows another block diagram of switch 102. In this example, switch 102 includes plural ports, for example, 36 ports, shown as Port1 through Port36. Each port includes a receive port (or segment) for receiving packets and a transmit port (or segment) for transmitting packets. Port (Port1-Port36) functions depend on the type of device it is attached to. For example, Port1 144 may be coupled to Device1 146 and may be used primarily to route packets to and from Device1 146. Similarly, Port 19 (142) is coupled to spine 140. Although FIG. 1C shows 36 ports, the adaptive aspects disclosed herein are not limited to any particular number of ports.

For illustration purposes only, in FIG. 1C, all ports coupled to end devices are on one side of ASIC 102 and ports connected to Spine 140 are on the opposite side. However, the ports may be located on any side of switch 102. This does not imply any difference in port or switch design. Actual physical layout of the ports depends on the physical layout of the switch 102.

Each port (for example, Port1-port36) includes transmit and receive connections to switch crossbar 148. Crossbar 148 may use information from routing table 154 to route packets. Although only one routing table is depicted there may be multiple copies to provide incremented bandwidth.

Register(s) 150 receive and hold control information accessible by processor 152. Processor 152 can change characteristics or operating configuration of switch 102 by placing certain control words in registers 150.

Bandwidth loss logic 156 (also referred to as "BLL" 156) monitors actual bandwidth on a network link to determine bandwidth loss. BLL 156 may be located in each switch element and switch port. BLL 156 may use one or more bandwidth loss determination parameters to determine bandwidth loss, according to an embodiment. The bandwidth loss detection parameter may include queue pair (QP) information for an Infiniband Switch, DLID, SLID or any other parameter. BLL 156 may be enabled by signal 156B generated by processor 152.

Figure 1D:
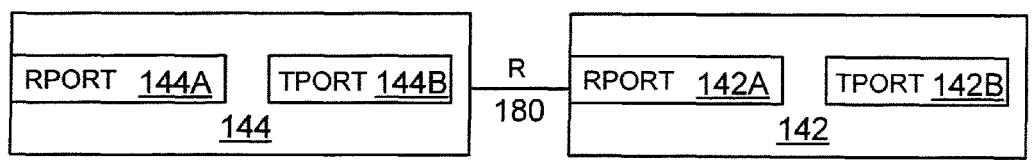
FIG. 1D shows network ports communicating in a network, according to one embodiment.

FIG. 1D shows network ports 144 and 142 communicating via a network link "R" (180). Link 180 may be capable of sending and receiving packets at 10 gigabytes per second (GB), 20 GB, 40 GB or at any other rate. Link 180 may be a single lane, four lane, eight lane or twelve lane connection.

Each end of link 180 has a transmit port (142B, 144B) and a receive port (142A, 144A). The transmit port (142B, 144B) is a node sourcing network packets. The receive port (142A, 144A) is a consumer of the network packets.

In the IB environment (or other similar environment (for example, Fibre Channel)), receive ports send a primitive (special character or special data packet) to a transmit port, before the transmit port can send a packet. The credit primitive or packet indicates the total amount of data that a transmit port is authorized to send. The primitive may also command the transmit port to stop sending packets as the receive port may be full or almost full. Hence, if a transmit port has a packet waiting for transmission but there is no credit available at the destination receive port, then a link's bandwidth is underutilized (i.e. there is bandwidth loss).

Referring back to the example of FIG. 1D, if TPORT 144B has a packet to send to RPORT 142A, then TPORT 144B has to wait for an indication from RPORT 142A that RPORT 142A has credit available i.e. RPORT 142A can receive the packet. If credit is unavailable and a packet is ready for transmission, there is loss of bandwidth in link 180 because the source port (144B) cannot transmit the packet.

Link 180 may have an ideal bandwidth B and actual bandwidth B'. Ideal bandwidth B depends on link capability (i.e. whether the link is 1 GB, 2 GB, 4 GB, 8G, 10G, 20G, 40G or any other rating). Actual bandwidth B' may be different from ideal bandwidth B due to various reasons, for example, loss of credit, link degradation or any other reason.

Hence, bandwidth loss (B") is based on the difference between the ideal bandwidth B and the actual bandwidth B', i.e., B"=B–B'

Bandwidth loss (B") may be due to various factors. As discussed above, one of the factors for loss of bandwidth is loss of credit as RPORT may not have capability to store and process a packet sent by a transmit port. Conventional switches do not efficiently monitor loss of bandwidth in a network link, especially due to the loss of credit. The present disclosure provides a method and system for reporting bandwidth loss on a network link that couples a switch to a network.

Figure 2:
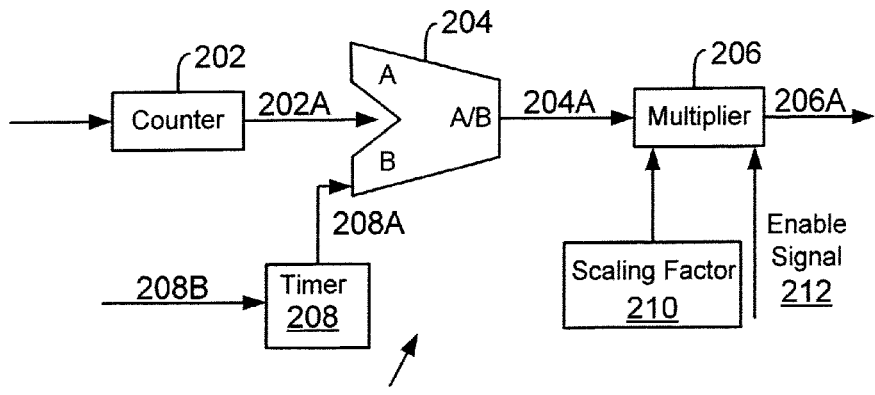
FIG. 2 shows an example of logic used for reporting bandwidth loss, according to one embodiment.

BLL 156 (FIG. 1C) monitors bandwidth of a network link and determines bandwidth loss (B") during network communication. The bandwidth loss B" on a network link is then reported to processor 152. In another embodiment, a user may use a system (e.g., 130, 132 or 134) to administer network system 100. Bandwidth loss is reported to the user for an appropriate action. BLL 156 is described in greater detail below, with respect to FIG. 2.

BLL 156 includes a counter 202, a divider 204, and a multiplier 206. When a packet is ready for transmission at a source port (for example, port 144, FIG. 1D), the transmit port 144B determines if it has a credit available for transmitting the packet to a destination receive port (for example, 142A). If a credit is unavailable but a packet is available, counter 202 value is incremented.

Thereafter, output 202A from counter 202 is sent to divider 204. Divider 204 divides counter value 202A with a timer value 208A that is generated by timer 208. Timer 208 tracks a period during which bandwidth loss is being determined. Timer 208 may be enabled by signal 208B, which may be generated by processor 152. Timer 208 may be reset by signal 208B at a set time interval or by processor 152, at any time.

Output 204A from divider 204 is sent to multiplier 206. Multiplier 206 is enabled by an enable signal 212 which is generated by processor 152 executing firmware code. Multiplier 206 multiplies output 204A with a scaling factor 210 to calculate the bandwidth loss 206A.

Scaling factor 210 may be a function of link rate, the timer duration and elapsed time. Scaling factor 210 may be determined by a computation algorithm or a lookup table (not shown). The scaling factor 210 may be derived by a hardware state machine or processor (129 or 152).

Figure 3:
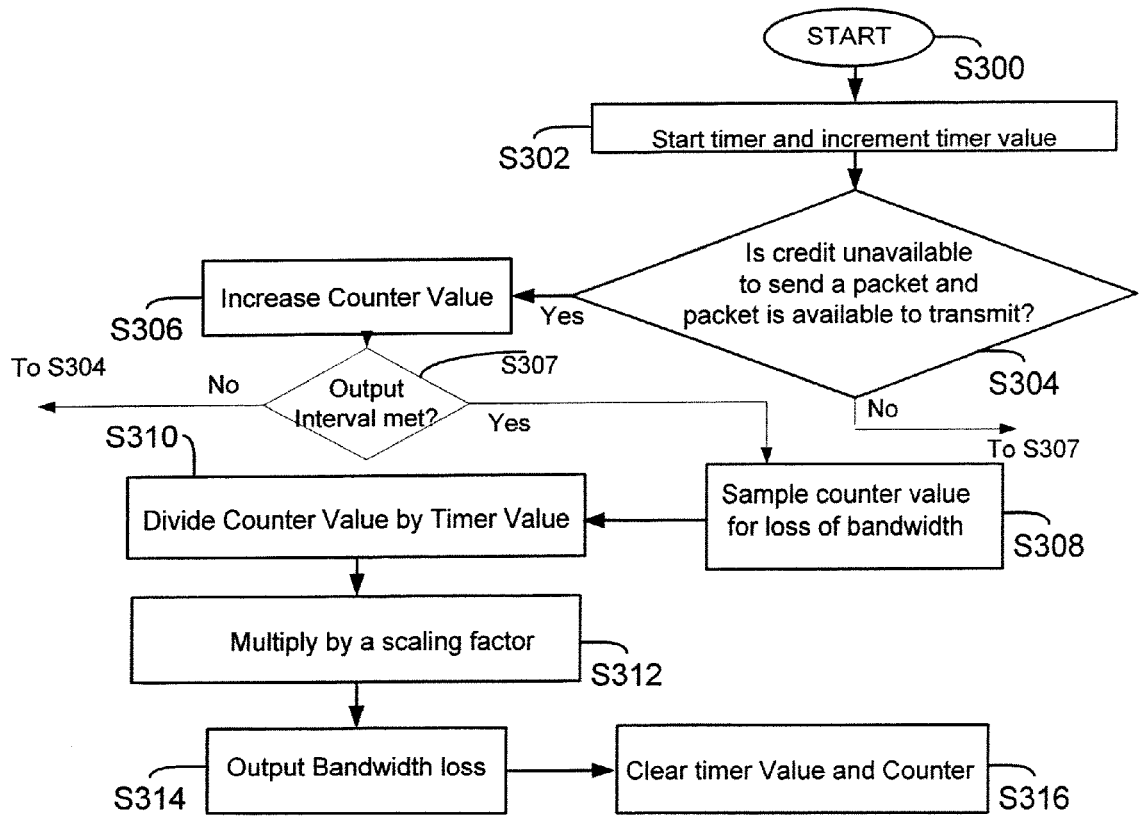
FIG. 3 shows a process flow for reporting bandwidth loss due to credit loss according to one embodiment.

FIG. 3 shows a process flow diagram for determining bandwidth loss on a network link, according to one embodiment. The process starts in S300, when a port (for example, 144) is operational, i.e., when the port can send and receive network packets. In step S302, timer 208 is started and incremented for a cycle.

In step S304, a transmit port (e.g. 144B) that has a packet to transmit determines if credit is unavailable for the pending packet. If credit is unavailable then counter 202 value is incremented in Step S306. If credit is available then the process moves to step S307.

In step S307, the process determines if an output interval is met. The output interval is an arbitrary duration that may be programmed in memory or may be a part of firmware code. The output interval duration is based on timer 208 value and determines when bandwidth loss should be reported. If the bandwidth loss output interval is met in Step S307, then in Step S308 counter 202 value is sampled. If the bandwidth loss output interval is not met in Step S307, the process continues back at Step S304.

In step S310, counter 202 output value 202A is divided by timer 208 value 208A. In step S312, divider 204 output 204A is multiplied by scaling factor 210. In Step S314, bandwidth loss 206A is reported to processor 152. In step S316, counter 202 and timer 208 are reset.

In another embodiment, bandwidth loss on a network link is determined and is compared with a threshold value. Based on the comparison, bandwidth loss is reported to processor 152. The threshold value is used as a filter so that not every bandwidth loss is reported to processor 152.

The threshold value may be programmed by a user or set in firmware code. The threshold value may be stored in memory 105, registers 150 or at any other location.

Figure 4:
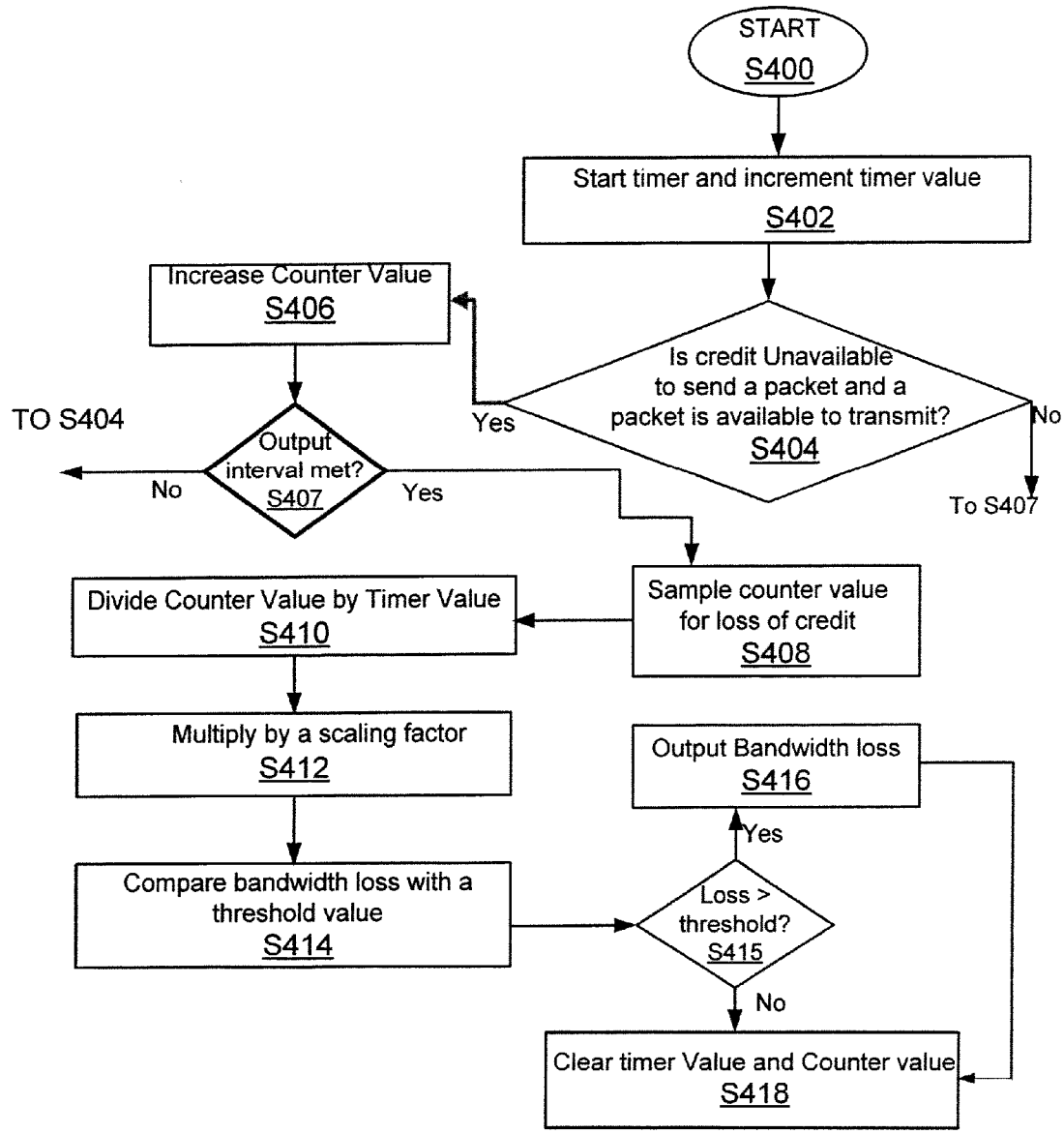
FIG. 4 shows a process flow diagram for reporting bandwidth loss due to credit loss after comparing the loss with a threshold value, according to one embodiment.

FIG. 4 shows a process flow diagram for determining bandwidth and reporting the bandwidth loss after comparing it with a threshold value. The process steps, S400, S402, S404, S406, S407, S408, S410, S412 are similar to steps S300, S302, S304, S306, S307, S308, S310 and S312, respectively, which are described above with respect to FIG. 3, and hence have not been described again.

Referring back to step S414, bandwidth loss 206A is compared with a threshold value. In Step S415, if the bandwidth loss 206A is greater than the threshold value, then bandwidth loss 206A is reported to processor 152 in step S416. In step S418, counter 202 and timer 208 are reset. In step S415, if the bandwidth loss 206A is lesser than the threshold value, counter 202 and timer are reset in step S418.

In yet another embodiment, other bandwidth loss determination parameters (for example, QP values, SLID, DLID or any other parameter in addition to loss of credit) may be used to detect and report bandwidth loss. Bandwidth loss determination parameters may be pre-defined and stored in memory 105, registers 150 or at any other location. BLL 156 may be programmed to monitor bandwidth loss only when these parameters are met. For example, if packets are ready for transmission for a particular DLID, SLID or Queue Pair (QP), bandwidth loss may be computed. Bandwidth loss that occurs on other packets that do not match the parameters is ignored or computed in a different parallel process.

Figure 5:
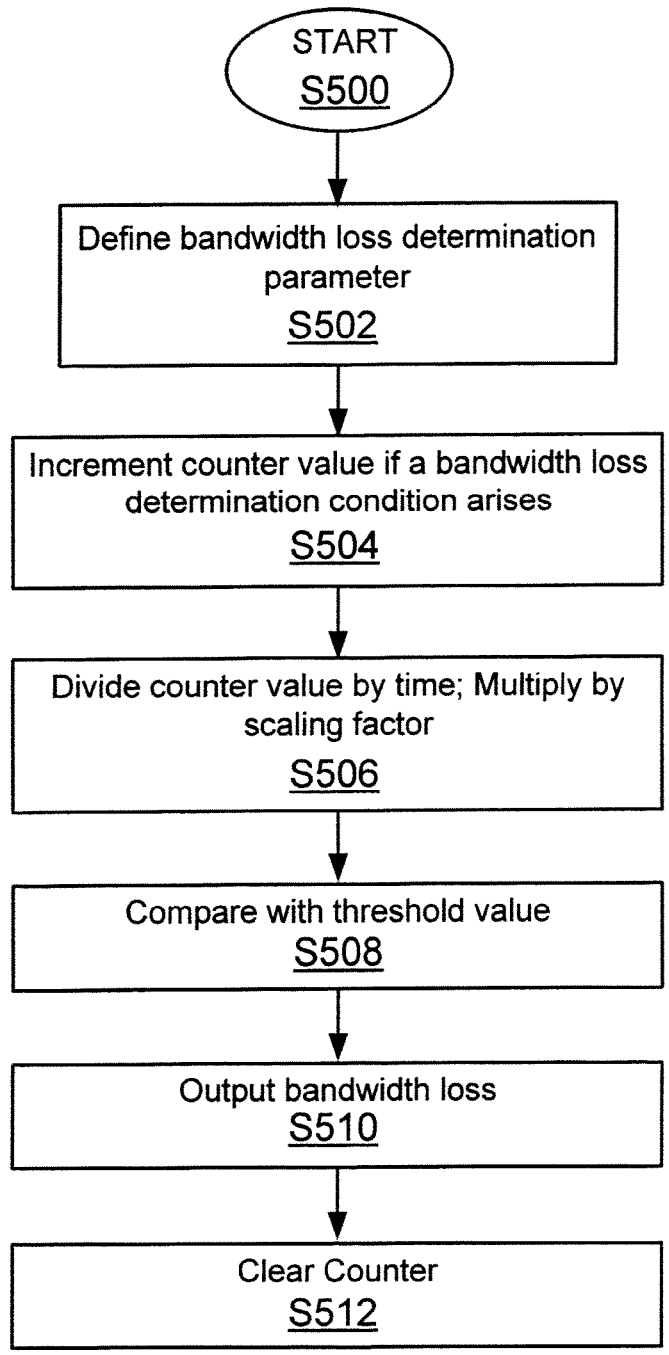
FIG. 5 shows a process flow diagram for reporting bandwidth loss, according to another embodiment.

FIG. 5 shows a process flow diagram for determining and reporting bandwidth loss on a network link using packet selection parameters, according to one embodiment.

The process starts in S500, when a port is operational, i.e., the port can send and receive network packets. In Step S502, packet selection parameters are defined for reporting bandwidth loss. The number and type of packet selection parameters may be defined by a user using system 130 and a software interface (not shown). Default packet selection parameters may also be a part of firmware code, which allows processor 152 to enable bandwidth logic 156 to detect and report bandwidth loss.

In step S504, BLL 156 determines if bandwidth loss determination condition has arisen. For example, bandwidth loss condition may arise if a port is not able to transmit packet with a specific DLID, SLID and/or QP value. In step S504, a counter 202 value 202A is incremented if a bandwidth loss condition arises.

In step S506, counter 202 output value 202A is divided by timer 208 value (as discussed above with respect to FIGS. 3 and 4). Divider 204 output 204A is also multiplied by a scaling factor 210 to determine bandwidth loss 206A.

In step S508, bandwidth loss 206A is compared with a threshold value. If bandwidth loss 206A is beyond the threshold value, then in step S510, bandwidth loss 206A is reported to processor 152. In step S512, counter 202 and timer 208 are reset.

Determination and reporting of bandwidth loss on a network link provides actual available bandwidth. A network administrator can use this information to make configuration changes to optimize network traffic. This helps in reducing network congestion.

Although the present invention has been described with reference to specific embodiments, these embodiments are illustrative only and not limiting. Many other applications and embodiments of the present invention will be apparent in light of this disclosure and the following claims.

What is claimed is:

1. A method for reporting bandwidth loss on a link that couples a device to a network, comprising:
    defining at least one parameter for determining bandwidth loss, wherein bandwidth loss occurs if a transmit port has a packet waiting for transmission but the packet cannot be transmitted;
    defining at least one parameter for selecting packets to measure bandwidth loss;
    storing the parameters in a memory;
    determining bandwidth loss on selected packets that meet the at least one packet selection parameter;
    comparing the bandwidth loss to a threshold value; and
    reporting the bandwidth loss to a processor for the device if the bandwidth loss exceeds the threshold value.

2. The method of claim 1, wherein the step of determining bandwidth loss comprises increasing a counter when the at least one bandwidth loss determination parameter is met.

3. The method of claim 2, wherein the step of determining bandwidth loss further comprises dividing the counter value by a timer value and multiplying a result of the division by a scaling factor to determine the bandwidth loss.

4. The method of claim 1, wherein the device is a switch.

5. The method of claim 1, wherein the at least one bandwidth loss determination parameter includes a queue pair (QP).

6. The method of claim 1, wherein the at least one packet selection parameter includes a destination identifier (DLID), a source identifier (SLID), or a combination thereof.

7. The method of claim 1, wherein the at least one packet selection parameter includes a queue pair (QP).

8. The method of claim 1, wherein the packet cannot be transmitted because there is no credit available at a destination receive port.

9. A device coupled to a network via a link, comprising:
    a processor for executing code;
    a port for receiving and transmitting packets; and
    bandwidth loss logic for determining and reporting bandwidth loss, wherein bandwidth loss occurs if a transmit port has a packet waiting for transmission but the packet cannot be transmitted;
    wherein at least one parameter for determining bandwidth loss is defined, and the bandwidth loss logic determines bandwidth loss on packets selected using at least one packet selection parameter, compares the bandwidth loss to a threshold value, and reports the bandwidth loss to the processor if the bandwidth loss exceeds the threshold value.

10. The device of claim 9, wherein the device is a switch.

11. The device of claim 9, wherein the bandwidth loss logic increases a counter value when the at least one bandwidth loss determination parameter is met.

12. The device of claim 11, wherein the bandwidth loss logic divides the counter value by a timer value, and multiplies a result of the division by a scaling factor to determine the bandwidth loss.

13. The device of claim 9, wherein the at least one bandwidth loss determination parameter includes a queue pair (QP).

14. The device of claim 9, wherein the at least one packet selection parameter includes a destination identifier (DLID), a source identifier (SLID), or a combination thereof.

15. The device of claim 9, wherein the at least one packet selection parameter includes a queue pair (QP).

16. The device of claim 9, wherein the packet cannot be transmitted because there is no credit available at a destination receive port.

17. A system including a device coupled to a network via a link, the device comprising:
    a processor for executing code;
    a port for receiving and transmitting packets: and
    bandwidth loss logic for determining and reporting bandwidth loss, wherein bandwidth loss occurs if a transmit port has a packet waiting for transmission but the packet cannot be transmitted;
    wherein at least one parameter for determining bandwidth loss is defined, and the bandwidth loss logic determines bandwidth loss on packets selected using at least one packet selection parameter, compares the bandwidth loss to a threshold value, and reports the bandwidth loss to the processor if the bandwidth loss exceeds the threshold value.

18. The system of claim 17, wherein the device is a switch.

19. The system of claim 17, wherein the bandwidth loss logic increases a counter value when the at least one bandwidth loss determination parameter is met.

20. The system of claim 19, wherein the bandwidth loss logic divides the counter value by a timer value, and multiplies a result of the division by a scaling factor to determine the bandwidth loss.

21. The system of claim 17, wherein the at least one bandwidth loss determination parameter includes a queue pair (QP).

22. The system of claim 17, wherein the at least one packet selection parameter includes a destination identifier (DLID), a source identifier (SLID), or a combination thereof.

23. The system of claim 17, wherein the at least one packet selection parameter includes a queue pair (QP).

24. The system of claim 17, wherein the packet cannot be transmitted because there is no credit available at a destination receive port.

* * * * *

UNITED STATES PATENT AND TRADEMARK OFFICE
CERTIFICATE OF CORRECTION

| | | |
|---|---|---|
| PATENT NO. | : 8,441,929 B1 | Page 1 of 1 |
| APPLICATION NO. | : 13/026007 | |
| DATED | : May 14, 2013 | |
| INVENTOR(S) | : Frank R. Dropps et al. | |

It is certified that error appears in the above-identified patent and that said Letters Patent is hereby corrected as shown below:

In the Specification:

In column 5, lines 21-23, delete "Hence, bandwidth loss (B") is based on the difference between the ideal bandwidth B and the actual bandwidth B', i.e., B"=B-B"." and insert the same on Col. 5, Line 20, after "reason." as a continuation of the Paragraph.

In column 6, lines 29-31, delete "The threshold value may be programmed by a user or set in firmware code. The threshold value may be stored in memory 105, registers 150 or at any other location." and insert the same on Col. 6, Line 28, after "processor 152." as a continuation of the Paragraph.

In the Claims:

In column 8, line 34, in Claim 17, delete "packets: and" and insert -- packets; and --, therefor.

Signed and Sealed this
Seventeenth Day of September, 2013

Teresa Stanek Rea
*Deputy Director of the United States Patent and Trademark Office*